J. B. THOMAS.
TRANSFORMATION PICTURE.
APPLICATION FILED MAR. 11, 1915.
1,165,466.  Patented Dec. 28, 1915.
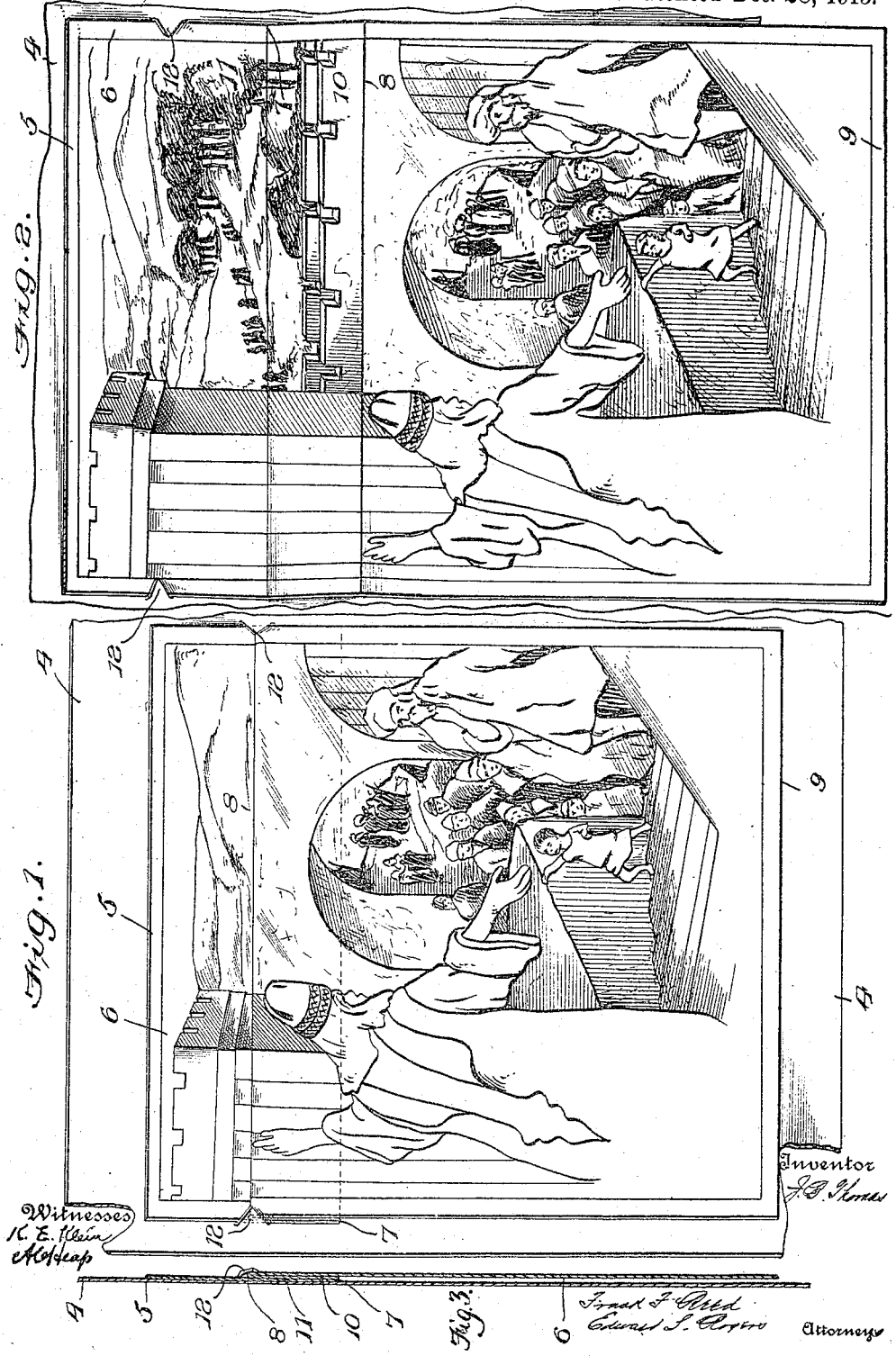

UNITED STATES PATENT OFFICE.

JOHN B. THOMAS, OF DETROIT, MICHIGAN, ASSIGNOR TO DAVID C. COOK PUBLISHING CO., OF ELGIN, ILLINOIS.

TRANSFORMATION-PICTURE.

1,165,466.   Specification of Letters Patent.   Patented Dec. 28, 1915.

Application filed March 11, 1915. Serial No. 13,782.

*To all whom it may concern:*

Be it known that I, JOHN B. THOMAS, a citizen of the United States, residing at Detroit in the county of Wayne and State of Michigan, have invented certain new and useful Improvements in Transformation-Pictures, of which the following is a specification.

This invention relates to transformation pictures and more essentially to that class of such devices more particularly adapted to be used in connection with a page of a book in order to illustrate the text thereof.

The primary object of this invention is to provide a picture comprising a single sheet of material having a representation of certain scenes or succession of subjects thereon, so arranged as to display either a part or the whole of such scene or subject.

A further object of the invention is the provision of a sheet of material adapted to be folded and having the picture so arranged thereon as to vary the presentation when such sheet is in folded or unfolded position.

A still further object of this invention is to provide means for sustaining the material when in folded position in order to display a certain representation.

With these and other objects in view as will hereinafter appear, this invention consists in the peculiar construction of a transformation picture set forth in the following specification and more particularly defined in the appended claims.

Referring to the accompanying drawings forming a portion of this specification and illustrating the preferred embodiment of the invention, and wherein similar reference characters indicate similar parts wherever used, Figure 1 is a plan view showing the picture in one form of presentation; Fig. 2 is a plan view showing the picture adjusted to present another form and Fig. 3 is a section on line 3—3 of Fig. 1.

The numeral 4 designates a page of a book, a lesson sheet or similar device. Secured to the page 4 at the part 5, by suitable adhesive or in any desired manner, is a sheet 6 bearing thereon a picture illustrating the desired text. This sheet 6 is folded at 7 upwardly and again downwardly at 8, and the picture thereon is so placed as to present a complete picture illustrating an event when the sheet is folded as in Fig. 1.

When it is desired to illustrate further in order to follow the sequence of events the edge 9 of the sheet 6 is pulled downwardly to straighten out the folds 7 and 8 which reveal that portion of the picture carried by the folded in part 10 and also the part 11 which was hidden by the part 10, which hidden portions 10 and 11 are so printed as to form with the rest of the picture a continuing scene or subject illustrating the text following.

In order to retain the folds 6, 7 in position, members 12 are formed on the page 4 under which the fold 7 is adapted to engage to support the picture in position. The clip members 12 preferably, as shown, are struck from the supporting page 4, but it is obvious that the same may be made in any other suitable manner.

Having thus described my invention what I claim as new and desire to secure by Letters Patent is:

1. A changeable picture comprising a sheet presenting a complete pictorial representation on one side thereof, said complete pictorial representation being formed of a plurality of sections and having a pair of fold lines formed in the sheet adapted when the sheet is folded to bring the end sections of the sheet in juxtaposition and form a different picture.

2. A changeable picture comprising a sheet presenting a complete pictorial representation on one side thereof, said complete pictorial representation being formed of a plurality of sections, having a pair of fold lines formed in the sheet adapted when the sheet is folded to bring the end sections of the sheet in juxtaposition and form a different picture, and means mounted adjacent the edges of the sheet adapted to engage the folded sections to hold the sheet in folded position.

3. In a device of the character set forth, the combination with a page, of a sheet displaying pictorial representations, a portion of said sheet being suitably fastened to said page, a plurality of folds in said sheet whereby to present varying pictorial representations in its folded and unfolded position, and means carried by said page for holding said sheet in folded position, said means comprising a plurality of tabs struck up from said page.

In testimony whereof I affix my signature in presence of two witnesses.

JOHN B. THOMAS.

Witnesses:
JAMES P. BARRY,
PHYLLIS COBURN.